Figure 1:
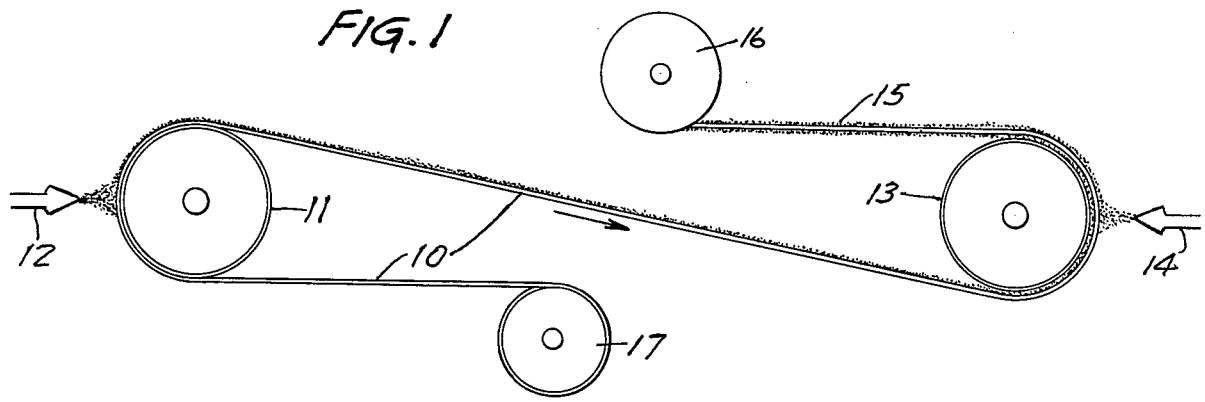

United States Patent [19]

Ward

[11] 4,104,340

[45] Aug. 1, 1978

[54] METHOD OF MAKING STRUCTURAL MEMBER FROM PREPREG SHEET OF FUSIBLE RESIN MICROFIBERS AND HEAT-RESISTANT REINFORCING FIBERS

[75] Inventor: Gene R. Ward, St. Paul, Minn.

[73] Assignee: Minnesota Mining and Manufacturing Company, St. Paul, Minn.

[21] Appl. No.: 712,834

[22] Filed: Aug. 9, 1976

Related U.S. Application Data

[63] Continuation-in-part of Ser. No. 544,192, Jan. 27, 1975, abandoned.

[51] Int. Cl.² .............................................. B01J 2/04
[52] U.S. Cl. ......................................... 264/6; 264/13; 264/14; 264/112; 264/113; 264/126
[58] Field of Search ............... 264/112, 113, 121, 126, 264/6, 13, 14

[56] References Cited

U.S. PATENT DOCUMENTS

| | | | |
|---|---|---|---|
| 2,483,406 | 10/1949 | Francis, Jr. | 264/113 |
| 3,073,735 | 1/1963 | Till et al. | 264/113 |
| 3,824,086 | 7/1974 | Perry et al. | 264/112 |

*Primary Examiner*—Robert F. White
*Assistant Examiner*—James R. Hall
*Attorney, Agent, or Firm*—Cruzan Alexander; Donald M. Sell; Roger R. Tamte

[57] ABSTRACT

Method of making structural members from pliant, porous, solvent-free prepreg sheet comprising fusible resin microfibers and heat-resistant reinforcing fibers, which microfibers provide a lofty, clinging surface quality and fuse under heat and pressure to provide an essentially void-free matrix for the reinforcing fibers. Pieces of the novel prepreg sheet are conveniently molded under heat and pressure to provide laminated structural members.

15 Claims, 3 Drawing Figures

U.S. Patent　　　　Aug. 1, 1978　　　　4,104,340

METHOD OF MAKING STRUCTURAL MEMBER FROM PREPREG SHEET OF FUSIBLE RESIN MICROFIBERS AND HEAT-RESISTANT REINFORCING FIBERS

CROSS-REFERENCE TO RELATED APPLICATIONS

The present application is a continuation-in-part of application Ser. No. 544,192, filed Jan. 27, 1975 now abandoned. Filed concurrently herewith is a divisional application directed to the subject matter of original claims 7-14 of said application Ser. No. 544,192, which claims were not prosecuted in that application as a result of a requirement for restriction in the office action dated Nov. 7, 1975.

BACKGROUND OF THE INVENTION

It is well known that the strongest, most uniform fiber-reinforced resin structural members are obtained by molding lay-ups of sheets of long reinforcing fibers which have been impregnated with all of the resin necessary to provide a void-free product. Because no resin need be added during the molding process, such sheets are called "prepregs" and inherently provide structures of higher strength and better uniformity than can be achieved where the molder must apply resin to the reinforcing fibers.

Prepreg sheets of high-melting thermoplastic resins tend to be stiff and slippery at room temperature and hence difficult to lay up except in flat molds. A residue of approximately 10-15% by weight of solvent in the resin can provide sufficient pliability and tackiness for use in contoured molds, but the solvent must be completely evaporated prior to molding to insure strong, void-free structures. If all of the solvent is driven off before the prepreg sheet is put to use, it is customary to preheat the sheet to give it some flexibility and surface tack.

Due to such difficulties, prepreg sheets are more commonly based on thermosetting resins of initially low molecular weight. Admixtures of such resins with crosslinking agents tend to be supple and tacky at room temperature. However, thermosetting resin compositions which have high softening temperatures have seldom been used to make prepreg sheets.

OTHER PRIOR ART

Because the present invention makes use of polymeric microfibers and especially blown thermoplastic microfibers, attention is directed to some of the voluminous patents and other publications in that art. For rather comprehensive disclosure of melt-blowing thermoplastic microfibers, see Report No. 4364 of the Naval Research Laboratory dated May 25, 1954, entitled "Manufacture of Superfine Organic Fibers" by V. A. Wente et al., which is incorporated herein by reference. As taught at pages 1 and 2 of the report, an extruder forces a jet of liquefied resin "through a row of fine orifices and directly into two converging high-velocity streams of gas (usually air) . . . . The actual point at which a fiber is formed lies within the gas stream where the stream attains its peak velocity . . . . As a consequence of the cooling undergone by the air when expanding, the fibers are solidified upon reaching a point one to two inches away from the nozzle . . . . The collection method employed for the fibers is simply a process of pulling the air through a moving wire screen and thereby depositing the plastic on the screen as a random mesh of fibers." As disclosed at page 8 of the report, these blown microfibers may be employed to make specialty papers, non-woven fabrics and high-efficiency filter papers. The report states: "Combinations of fine organic fibers with coarser ones and with glass fibers hold interesting possibilities."

The bulk of the blown microfiber art concerns filters, and in making these, the blown microfibers are sometimes combined with fibers having higher strength and better resistance to high temperatures. U.S. Pat. No. 3,073,735 (Till) concerns filters made by depositing onto a perforated endless screen intermingled solution-blown microfibers and textile fibers such as rayon, cotton or wool. U.S. Pat. No. 2,483,406 (Francis) claims a process wherein fine thermoplastic solution-blown microfibers are deposited onto a web of natural fibers such as cotton, or synthetic fibers such as cellulosic fibers, or mineral fibers such as spun glass. The resulting product may be converted into a textile yarn or a flat textile felt.

THE PRESENT INVENTION

The present invention provides fiber-reinforced resin structural members from lay-ups of one or more pieces of a prepreg sheet which may be made by extruding liquefied resin through at least one fine orifice into a high-velocity stream of expanding gas which cools and solidifies the emerging jet of resin to provide fusible resin microfibers having an average diameter of 0.1-25 micrometers. The turbulence of the stream of expanding gas causes the solidified microfibers to become randomly intermingled. These are collected with reinforcing fibers to provide an open, pliant prepreg sheet. The prepreg sheet may be made by simultaneously depositing randomly intermingled fusible resin microfibers and reinforcing fibers onto a porous screen in a manner such that the microfibers and reinforcing fibers are entangled into an open, more-or-less homogeneous composite including by volume 12-98 parts of the microfibers and 2-80 parts of the reinforcing fibers. More conveniently, the resin microfibers are deposited in the same relative amounts onto each side of a pliant pre-formed self-sustaining web of reinforcing fibers such as a web of randomly intermingled fibers created on a Rando Webber, either directly or by collecting them on a porous screen and then removing and depositing the collected microfibers onto each side of a pliant self-sustaining web of reinforcing fibers. The self-sustaining web of reinforcing fibers may contain a small amount of binder resin, up to about 10% of the real volume* of the prepreg sheet, for strength and handleability. The binder resin may be either thermoplastic or thermosetting. If thermosetting, the binder resin may be partially or completely precured prior to application of the resin microfibers as long as the pre-curing does not unduly inhibit the pliancy of the self-sustaining web and the resultant prepreg sheet.

*disregarding voids

Generally, the prepreg sheet has a voids volume of at least 50%, preferably 70-85%. At a high voids volume, the pliancy of the prepreg sheet approaches that of a self-sustaining web of the reinforcing fibers alone.

The resin microfibers should extend to both surfaces of the prepreg sheet and should afford a lofty surface quality to enhance the tendency of pieces of the prepreg sheet to cling to vertical surfaces of a mold and to each other. This surface quality and the pliancy of the prepreg sheet make it easy to lay up pieces of the sheet in contoured molds.

Where the prepreg sheet is produced by collecting randomly intermingled reinforcing fibers and resin microfibers, the latter tend to cling to each other to provide a self-sustaining sheet, especially if the amount of microfibers is relatively large, e.g., 50–70% of the real volume of the finished prepreg sheet. Integrity of the prepreg sheet may be enhanced by pre-coating the reinforcing fibers with an adhesion-promoting binder resin in amounts up to about 10% of the real volume of the prepreg sheet.

The resin microfibers may be made from either thermoplastic or thermosetting resin compositions which have softening points in the approximate range of 50° or 100° to 300° C and fuse within a temperature range at which the reinforcing fibers do not fuse or degrade. The resin microfibers may be either solution-blown or melt-blown or may be formed in any manner providing the desired average diameter. By employing sufficient resin microfibers to provide at least 20–25% of the real volume of the molded prepreg sheet, the application of heat and pressure to one or more layers of the prepreg sheet creates strong, dense structural members wherein the fused microfibers provide an essentially void-free matrix for the reinforcing fibers. However, for certain applications, it may be desirable to apply less pressure and/or heat to obtain molded fiber-reinforced structures of relatively low density, e.g., for battery-cell separators.

Dense molded structural members may be obtained using prepreg sheets based on self-sustaining webs of randomly intermingled or woven reinforcing fibers wherein the reinforcing fibers comprise up to about 75% of the real volume of the prepreg sheet. In order to attain essentially void-free molded structures wherein the reinforcing fibers comprise 80% of the real volume, it may be necessary to employ a highly unidirectional fabric or a web of lineally aligned reinforcing fibers. A suitable unidirectional web may be made by lineally aligning all of the reinforcing fibers in a contiguous web and fusing a bead of resin across the full web at intervals to provide about 2–12 parts by volume of binder resin per 100 parts of reinforcing fibers. Relatively brittle reinforcing fibers such as boron, graphite and stainless steel may be utilized in this fashion.

Where the reinforcing fibers have a fusible adhesion-promoting binder resin coating or are made into a preformed web including a binder resin, the resin microfibers may comprise as little as 12–15% of the real volume of the novel prepreg sheet, because the binder resin will, upon molding, provide part of the matrix for the reinforcing fibers. This assumes that the binder resin, if fusible, is compatible with the fused microfibers or, if infusible, is adhesively compatible with the fused microfibers.

The novel prepreg sheet may also contain other materials not changing its essential nature, e.g., small quantities of fillers or extenders.

Molded structural members of useful strength and durability may be obtained where the prepreg sheet comprises as little as 2 volume percent reinforcing fibers and as much as 98 volume percent microfibers and other materials, but to provide truly high strength, the reinforcing fibers should comprise at least 40% of the real volume of the prepreg sheet.

Any thermoplastic or thermosetting resin composition which fuses in the approximate range of 50° or 100° to 300° C can be used to provide microfibers for the present invention. Useful thermoplastic resins include polyethylene, polypropylene, nylons and other polyamides, and polyethylene terephthalate, all of which may be melt-blown; and phenoxy resins, polyvinyl chloride, polystyrene, polyarylsulfones, polycarbonates and certain polyimides which may be solution-blown. Useful thermosetting resins include epoxy resins, phenolic resins, certain polyester resins, silicones, polysulfides and certain polyimides which may be solution-blown. Preferably the average diameter of the resin microfibers is within the range of 2–10 micrometers, but a range of 0.1–25 micrometers is considered to be useful.

Any strong, durable, heat-resistant fibers may be used as the reinforcing fibers. The reinforcing fibers should not fuse or degrade at a temperature within about 50° C of the softening temperature of the fusible resin microfibers. Preferably the reinforcing fibers do not fuse or degrade at 300° C. An average length of at least 1 cm is suggested to provide molded structural members of good strength, preferably over 10 cm. Especially preferred are glass and other vitreous fibers. Also useful are fibers of asbestos, wool, cotton and synthetic polymers which are resistant to high temperatures (e.g., 300° C) such as certain high melting polyimide and aramide fibers, the latter being available from E. I. du Pont de Nemours & Co. under the brand name "Kevlar." Blown resin microfibers tend to adhere better to polymeric reinforcing fibers than to glass fibers.

To promote adhesion to each other, the resin microfibers and/or reinforcing fibers may be preheated to approximately the fusion point of the microfibers immediately before contacting each other. When using a preformed self-sustaining web of the reinforcing fibers, this may diminish the fibrous nature of the microfibers. Preferably the preheating is applied to the reinforcing fibers so that the deposited microfibers are progressively insulated from the heat to provide the lofty surfaces and the clinging quality that makes the prepreg sheet so easy to use.

The prepreg sheet by itself is believed to be novel, at least if the proportion of reinforcing fibers is relatively high, i.e., at least 40% of the real volume, thus providing high-strength molded structures. The novel prepreg sheet combines desirable properties not possessed by any single prepreg sheet of the prior art, namely, it (1) is pliant and hence readily conforms to the contours of most molds, (2) has a lofty surface quality enabling pieces of the prepreg sheet to cling to vertical surfaces of a mold and to each other, thus permitting fast lay-up, (3) is essentially solvent-free and essentially does not emit volatile matter when heated to molding temperature and (4) contains all the resin necessary to provide uniform void-free molded structures. Where the microfibers are thermoplastic, the molded structures can be ejected immediately after being formed and cooled, a characteristic common to prior thermoplastic-resin prepregs, but to very few thermosetting resin prepregs, if any.

THE DRAWING

Figure 2:
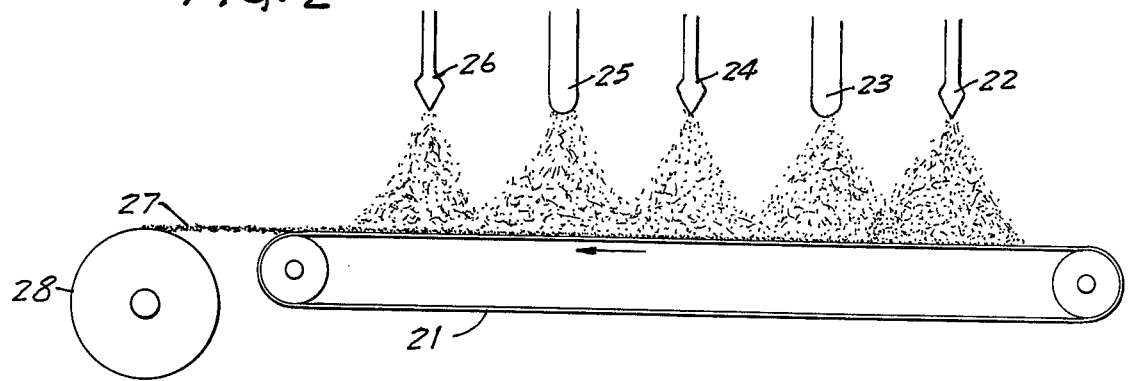
Figure 3:
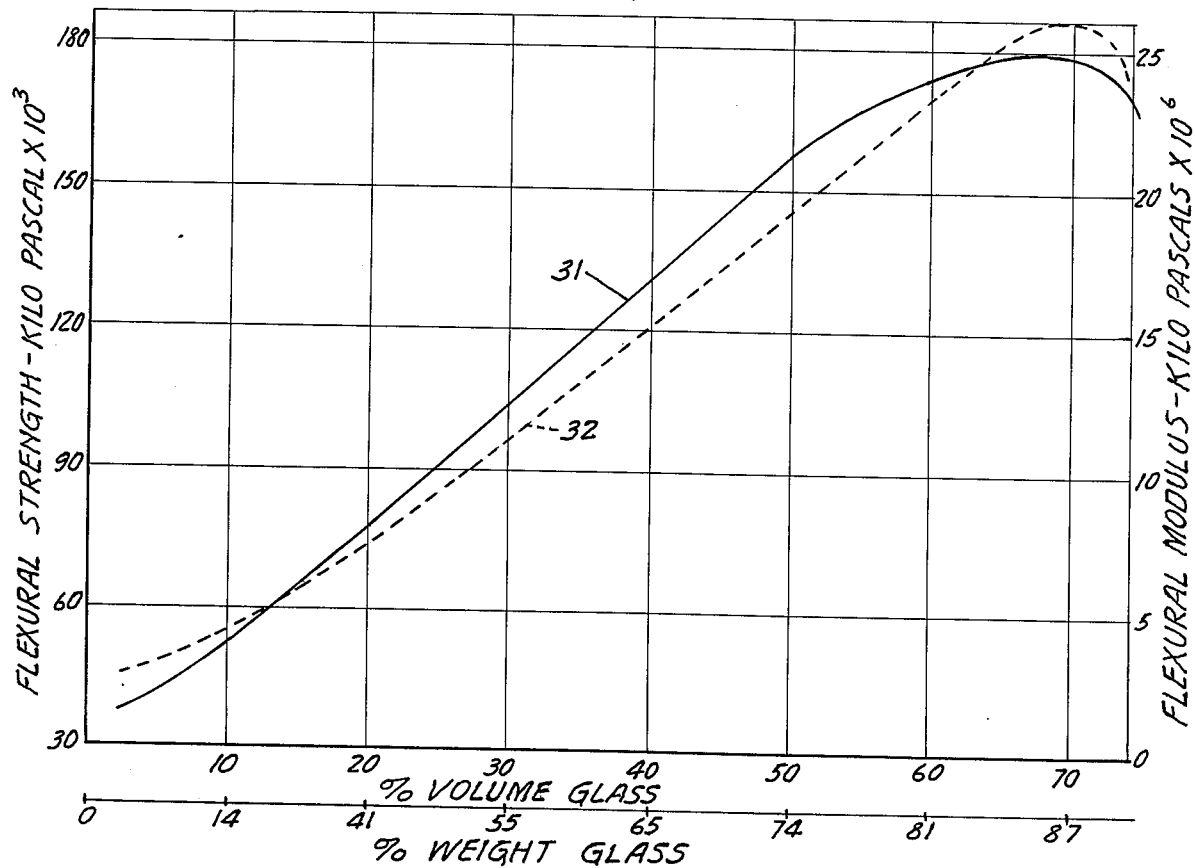

In the drawing:

FIG. 1 schematically illustrates apparatus for making a prepreg sheet of the present invention having a self-sustaining central web of reinforcing fibers and a pair of surface layers of entangled resin microfibers;

FIG. 2 schematically illustrates apparatus for making a prepreg sheet of the present invention wherein reinforcing fibers and resin microfibers are randomly intermingled; and FIG. 3 graphically indicates properties which may be obtained in the practice of this invention.

Referring first to FIG. 1, a self-sustaining web 10 of reinforcing fibers is carried around a first wire-screen roll 11, and resin microfibers are blown upon being extruded from a nozzle or nozzles 12 onto the web to form a layer of entangled microfibers on one surface of the web. The resultant composite is drawn around an identical wire-screen roll 13 while resin microfibers are blown onto the opposite surface of the web 10 through a nozzle or nozzles 14, after which the entire composite prepreg sheet 15 is wound up in a roll 16 for convenient storage and shipment. Sufficient tension is applied to the wind-up roll 16 and braking force to the supply drum 17 to insure that the web 10 is held firmly against the wire rolls 11 and 13 in spite of air currents generated by the nozzles 12 and 14.

In the apparatus of FIG. 2, resin microfibers are blown upon being extruded from a nozzle 22 onto a continuous wire-screen belt 21 at a spacing such that the microfibers are cooled by the air to near ambient temperature before striking the belt 21 so that the deposited microfibers do not fuse to the belt. Successive nozzles 23, 24, 25 and 26 successively deposit reinforcing fibers and resin microfibers in an overlapping fashion as illustrated to provide a self-sustaining composite prepreg sheet 27 of randomly intermingled resin microfibers and reinforcing fibers which is wound up in a roll 28.

If desired, the first two nozzles 22 and 23 may be directed to completely intermingle all of the fibers, and these two nozzles by themselves would be sufficient to provide a prepreg sheet of the present invention. Sufficient of the resin microfibers would extend to both surfaces to provide the important clinging attribute of the novel prepreg sheet. By likewise directing any subsequent nozzles in pairs, a composite prepreg sheet is obtained which is essentially homogeneous through its full thickness.

EXAMPLE

A web of woven glass fabric, Style 181 (ECG 150½ yarns, square weave, 300 g/m²) was drawn over a wire-screen roll of apparatus as illustrated in FIG. 1 of the drawing except that it contained only the first wire-screen roll. Microfibers of polypropylene (melt flow of 12 grams/10 minutes) were blown onto the moving glass fabric from a short distance so that the polypropylene microfibers contacted the glass web while still molten. This provided a fibrous film having an appearance similar to a coarse paper. This composite was returned to the unwind position, and the wire-screen roll was retracted so that the blown microfibers cooled below their fusing temperature before striking the paper-like polypropylene film to provide a lofty surface layer. There was sufficient adhesion between the glass web and the paper-like film and between the film and the lofty surface layer that it was necessary to peel the layers apart to separate them.

The foregoing two steps were repeated on the same apparatus to apply a paper-like film and a lofty surface layer of the polypropylene microfibers to the opposite surface of the glass fabric. Three prepreg sheets were thus prepared using three sets of conditions as follows:

|  | A | B | C |
|---|---|---|---|
| Polymer temperature ° C | 260 | 260 | 260 |
| Die Temperature ° C | 343 | 343 | 343 |
| Air temperature ° C | 443 | 443 | 443 |
| Air pressure (kg/cm²)* | 0.7 | 0.7 | 0.7 |
| Polymer flow rate (g/min.)** | | | |
| First pass each side | 30 | 18 | 18 |
| Second pass each side | 14 | 18 | 18 |
| Wire-screen velocity (cm/sec.) | | | |
| First pass each side | 1.7 | 2.3 | 4.5 |
| Second pass each side | 8.6 | 6.5 | 11.0 |
| Microfibers deposited (g/cm²×10⁻³) | | | |
| First pass each side | 33.4 | 14.1 | 7.6 |
| Second pass each side | 3.1 | 5.3 | 3.1 |
| Distance die-fabric (cm) | | | |
| First pass each side | 5 | 6 | 5 |
| Second pass each side | 63 | 40 | 35 |
| Approximate ratio of microfibers/glass | | | |
| Both sides by weight | 2:1 | 1:1 | 2:3 |
| Corrected to volume | 6:1 | 3:1 | 2:1 |

*Slot thickness of air orifice 0.3 mm
**Using about 200 0.3-mm-wide orifices

Each of prepreg sheets A, B and C was sufficiently pliant and had a clinging surface quality enabling pieces of the sheets to be readily laid up in molds having complex contours without need for any auxiliary holding techniques. Each prepreg sheet could be folded to angles of greater than 90° without any damage to the glass fibers and remained in place when laid against a vertical steel surface. Two pieces of each prepreg sheet when pressed together tended to stick to each other.

Because of the paper-like film layer, each of the prepreg sheets was somewhat less pliant than the glass fabric by itself, but prepreg sheet C had a nice pliancy. Although sheets A and B were somewhat stiffer, they were quite acceptable in this respect.

Each of the prepreg sheets of this example included sufficient resin to provide essentially void-free structural products when molded either singly or in plies. Preferred molding conditions are 175°-185° C at 1200-1500 kilo pascals.

Prepreg sheets made from the woven glass fabric and the blown polypropylene microfibers of this example can upon molding be expected to provide properties approximately as indicated by the curves shown in FIG. 3 of the drawing. The curve 31 indicates flexural strength (ASTM D-790) and the curve 32 indicates flexural modulus.

I claim:

1. Method of making a fiber-reinforced structural member comprising the steps of
   (a) extruding at least one jet of liquefied resin, which fuses within the range of 50°-300° C, through a fine orifice into a high-velocity stream of gas where the extruded jet is attenuated, subdivided, and cooled to form a stream of randomly intermingled solid fusible microfibers having an average diameter of 0.1-25 micrometers;
   (b) directing said stream of microfibers and at least one stream of reinforcing fibers which have an average length of at least 1 cm and do not fuse or degrade at or below the fusing temperature of the microfibers at a longitudinally moving porous screen so as to intermingle 12-98 volume-parts of said fusible microfibers and 2-80 volume-parts of said reinforcing fibers and form a composite open pliant prepreg sheet having a lofty surface quality enabling said sheet to conform to and cling to mold surfaces; said fusible microfibers extending to both surfaces of said formed sheet;

(c) removing said prepreg sheet from the porous screen;

(d) placing at least one layer of said prepreg sheet in a mold, to the surfaces of which said sheet clings;

(e) heating and pressing said prepreg sheet in said mold to fuse the microfibers to provide an essentially void-free matrix for the reinforcing fibers; and (f) cooling said sheet and releasing the pressure to provide an essentially void-free structural member comprising reinforcing fibers in a matrix of the resin of the microfibers.

2. Method as defined in claim 1 wherein step (b) involves depositing by volume 20–60 parts of the microfibers and 40–80 parts of the reinforcing fibers.

3. Method as defined in claim 1 wherein step (b) involves continuously moving said screen in the form of an endless belt past said orifice, continuously depositing the microfibers and reinforcing fibers onto the screen and step (c) involves continuously removing said prepreg sheet from the screen.

4. Method as defined in claim 1 wherein step (b) involves first depositing only microfibers on the screen, then intermingling and depositing reinforcing fibers and microfibers upon the first-deposited microfibers and finally depositing only microfibers upon the intermingled reinforcing fibers and microfibers so that both surfaces of the open sheet consist essentially only of the microfibers.

5. Method as defined in claim 1 wherein step (b) involves depositing with the resin microfibers and reinforcing fibers up to 10 volume percent of binder resin that is compatible with the resin of the microfibers and in step (e) the binder resin furnishes part of the essentially void-free matrix.

6. Method as defined in claim 5 wherein step (b) further involves coating the reinforcing fibers with the binder resin in an amount providing up to 10% of the real volume of the prepreg sheet prior to combining the reinforcing fibers with the solidified resin microfibers.

7. Method as defined in claim 6 wherein step (b) involves depositing the solidified resin microfibers in an amount providing only 12–15% of the real volume of the prepreg sheet.

8. Method as defined in claim 1 wherein step (a) involves extruding a hot melt of thermoplastic resin.

9. Method of making a fiber-reinforced structural member comprising the steps of (a) extruding a jet of liquefied resin, which fuses within the range of 50°–300° C, through a fine orifice into a high-velocity stream of gas where the extruded jet is attenuated, subdivided, and cooled to form a stream of randomly intermingled solid fusible microfibers having an average diameter of 0.1–25 micrometers;

(b) depositing said microfibers on at least one surface of a longitudinally moving fibrous web to form a composite open pliant prepreg sheet in which said fusible microfibers extend to a surface of the sheet, said sheet having a lofty surface quality enabling said sheet to conform to and cling to mold surfaces; said fibrous web comprising reinforcing fibers which have an average length of at least 1 cm and do not fuse or degrade at or below the fusing temperature of the microfibers; and said prepreg sheet comprising 12–98 volume-parts of said fusible microfibers and 2–80 volume-parts of said reinforcing fibers;

(c) placing at least one layer of said prepreg sheet in a mold with the microfiber surface against the mold surface, whereby said layer clings to the mold surface;

(d) heating and pressing said prepreg sheet in said mold to fuse the microfibers to provide an essentially void-free matrix for the reinforcing fibers; and (e) cooling said sheet and releasing the pressure to provide an essentially void-free structural member comprising reinforcing fibers in a matrix of the resin of the microfibers.

10. Method as defined in claim 9 wherein step (b) involves depositing the microfibers in an amount providing a prepreg sheet including by volume 20–60 parts of the microfibers and 40–80 parts of the reinforcing fibers.

11. Method as defined in claim 9 involving the additional step prior to step (b) of preheating the web of reinforcing fibers to approximately the fusing point of the microfibers so that the initially deposited microfibers fuse to the reinforcing fibers of the web.

12. Method as defined in claim 9 involving the additional step prior to step (b) of impregnating the web of reinforcing fibers with binder resin in an amount providing up to 10% of the real volume of said prepreg sheet.

13. Method as defined in claim 9 wherein step (b) involves depositing the microfibers in an amount providing only 12–15% of the real volume of the prepreg sheet.

14. Method as defined in claim 9 involving the additional step prior to step (b) of lineally aligning the reinforcing fibers and fusing beads of a binder resin across the full width of the web at intervals to provide 2–12 parts by volume of said binder resin per 100 parts of reinforcing fibers.

15. Method as defined in claim 9 wherein step (a) involves extruding a hot melt of thermoplastic resin.

* * * * *